(12) United States Patent
Gronbach et al.

(10) Patent No.: US 6,682,278 B2
(45) Date of Patent: Jan. 27, 2004

(54) UNIVERSAL COMBINED MILLING AND BORING MACHINE

(75) Inventors: Hans Gronbach, Eisenberg (DE); Gerd Hoppe, Habichtswald (DE)

(73) Assignee: Deckel Maho Pfronten GmbH (DE)

( * ) Notice: Subject to any disclaimer, the term of this patent is extended or adjusted under 35 U.S.C. 154(b) by 0 days.

(21) Appl. No.: 10/229,478

(22) Filed: Aug. 27, 2002

(65) Prior Publication Data

US 2003/0049087 A1 Mar. 13, 2003

(30) Foreign Application Priority Data

Aug. 27, 2001 (DE) .......................... 101 41 865

(51) Int. Cl.⁷ .............................. B23C 1/00; B23D 7/00
(52) U.S. Cl. ...................... 409/235; 409/137; 409/201; 409/204; 409/211; 409/216
(58) Field of Search ................ 409/235, 201, 409/204, 211, 216, 137; 408/234

(56) References Cited

U.S. PATENT DOCUMENTS

| | | | | |
|---|---|---|---|---|
| 4,955,770 A | * | 9/1990 | Kitamura | 409/134 |
| 5,586,848 A | * | 12/1996 | Suwijn | 409/137 |
| 6,099,217 A | * | 8/2000 | Wiegand et al. | 409/201 |

FOREIGN PATENT DOCUMENTS

| | | | | |
|---|---|---|---|---|
| DE | 29803274 U1 | * | 6/1998 | B25J/17/02 |
| GB | 2329138 A | * | 3/1999 | B23Q/1/25 |
| SU | 846250 b | * | 7/1981 | B24B/41/04 |
| WO | WO 45991 A1 | * | 8/2000 | B23Q/1/54 |

OTHER PUBLICATIONS

W. Eberlein et al., Bearabeitungszentrum mit Tripodentechnik (Machining Center Making Use of the Tripod Technology), VDI–Z, 143, No. 6, pp. 38–40 (Jun. 2001).
NEOS ROBOTICS Trade Literature (5 pages), publication date unknown.

\* cited by examiner

*Primary Examiner*—A. L. Wellington
*Assistant Examiner*—Dana Ross
(74) *Attorney, Agent, or Firm*—The Maxham Firm

(57) ABSTRACT

A relatively compact, program-controlled, universal combined milling and boring machine having a horizontal base as a support for a work table, a machine frame and a supporting system for at least one spindle head. The spindle head contains a dimensionally stable central tube, a spindle head support mounted on the lower end thereof, three telescopic bars arranged at a solid angle displacement of about 120° and coupled to the spindle head support in universal bearings, and an upper support member having universal bearings for the central tube and for each telescopic bar. The machine frame is preferably provided together with the base as an integrated, dimensionally stable, support structure and has two side walls, a top, front traverse and a lower rear wall. The supporting member of the supporting system is inclined between the top side of rear wall and the traverse.

3 Claims, 5 Drawing Sheets

UNIVERSAL COMBINED MILLING AND BORING MACHINE

BACKGROUND OF INVENTION

1. Field of Invention

The invention relates to a machine tool, and more particularly to a machine tool for milling and boring workpieces.

2. Discussion of Related Art

Current machine tools designed to process large workpieces, such as aircraft parts, typically have relatively long traveling work tables for accommodating and accurately fixing these large workpieces. They may also have traveling stands that can travel laterally along the workpiece in correspondingly long guide rails and upon which the supporting system of the machining unit is mounted. The basic axes are realized as parallel kinematics and the head axes are designed as serial axes. For example various designs of such a machine tool are produced under the mark TRICEPT® (Neos Robotics AB Corporation Sweden of Taby, Sweden).

Universal machine tools in which the machining unit carries the milling head in the form of a tripod have been described. See Dr. Werner Eberlein and Ulrich Schleider, "Bearbeitungszentrum mit Tripodentechnik" [Machining Center Making Use of The Tripod Technology], VDI-Z 143, No.6, pgs. 38–40 (June 2001). The spindle support casing in that device is supported with three degrees of freedom, and moved by three triangular guides by a joint. Each triangular guide is pivoted to an associated linear guiding system. The guiding systems are disposed in a cylindrical receiving body. The integrated slides are moved longitudinally by recirculating ball screws and servo drives. In this system, the working spindle having an integrated drive motor can be moved within a solid angle of 80°. However, this machine type is designed to machine extremely large-area workpieces, in particular large structural parts, for example, aircraft wings that may have overall lengths of 2.5 m and traveling paths of up to 30 m.

SUMMARY OF THE INVENTION

The present invention relates to a program-controlled universal combined milling and boring machine. In one embodiment, the invention has a horizontal base serving as a support for a work table, a machine frame, and a supporting system for at least one spindle head. The spindle head contains a dimensionally stable central tube, a spindle head support mounted on the lower end thereof, three telescopic bars arranged at a solid angle displacement of 120° and coupled by means of cardanic mounting to the spindle head support, and a top supporting member having universal bearings for the central tube and for each telescopic bar.

It is one objective of the invention to provide a universal combined milling and boring machine having a compact design and providing a high degree of machining accuracy. The extreme unit rigidity and highly accurate tool positioning afforded by the machine of the present invention are factors contributing to the above objective.

Specifically, this objective may be achieved by the present invention providing the machine frame together with the base as an integrated dimensionally stable support structure. The support structure may have two side walls, a dimensionally stable front traverse and a lower rear wall, and inclining the supporting member of the supporting system between the lower rear wall and the traverse.

The machine frame, together with the integrated base of the work table, provide a box-like shape that affords an extremely high degree of rigidity, thus obtaining maximum machining accuracy. The inclined position of the supporting element for the central tube, along with the machining head and the three telescopic bars, result in a particularly favorable position for the spindle head. They also result in loads that are more uniform as compared to a vertical or horizontal arrangement of the supporting element. The machine tool according to the invention is relatively compact and only requires a relatively small floor space. The advantageous tripod mounting of the machine herein is afforded by the table being fixed on the base.

A preferred embodiment of the invention has a supporting member of the supporting system designed as a flat, dimensionally stable slide and movable in horizontal guides of the traverse and the rear wall by means of a motor. This movability of the slide, and thus also of the machining unit, provides optimum positioning of the machine head relative to the workpiece. Since the masses of the slide and the units supported by it are relatively small and virtually constant, further advantages result for the slide movements, specifically in relation to the design and effectiveness of the drive and control aggregates.

It is preferred that the slide have a generally triangular shape and be supported by its longer rear side by means of two terminal guide elements on a guide rail mounted on the rear wall. On the shorter front side, the slide is preferably supported by means of at least one guiding element on a guide rail attached to the front top traverse. Due to this shape and support of the slide, a favorable transfer of the slide forces occurs during the machining step from slide to machine frame, even if the machining tool is extremely displaced.

One significant feature of the machine tool according to the present invention is the single-part design of the central tube. Previous devices typically have multi-part designs in which the individual parts have to be aligned relative to one another during the assembly and then be fixed. These steps may result in inaccuracies in positioning behavior. Due to the single-part tube design of the present invention, such an alignment step is unnecessary. In addition the positioning accuracy of the universal joints or bearings relative to the telescopic bars, which act as linear guides, is established directly during the manufacturing process. This allows improved tolerances to be achieved.

BRIEF DESCRIPTION OF THE DRAWINGS

The objects, features and advantages of the invention will be more clearly perceived from the following detailed description, when read in conjunction with the accompanying drawing, wherein.

DETAILED DESCRIPTION OF THE PREFERRED EMBODIMENTS

Figure 1:
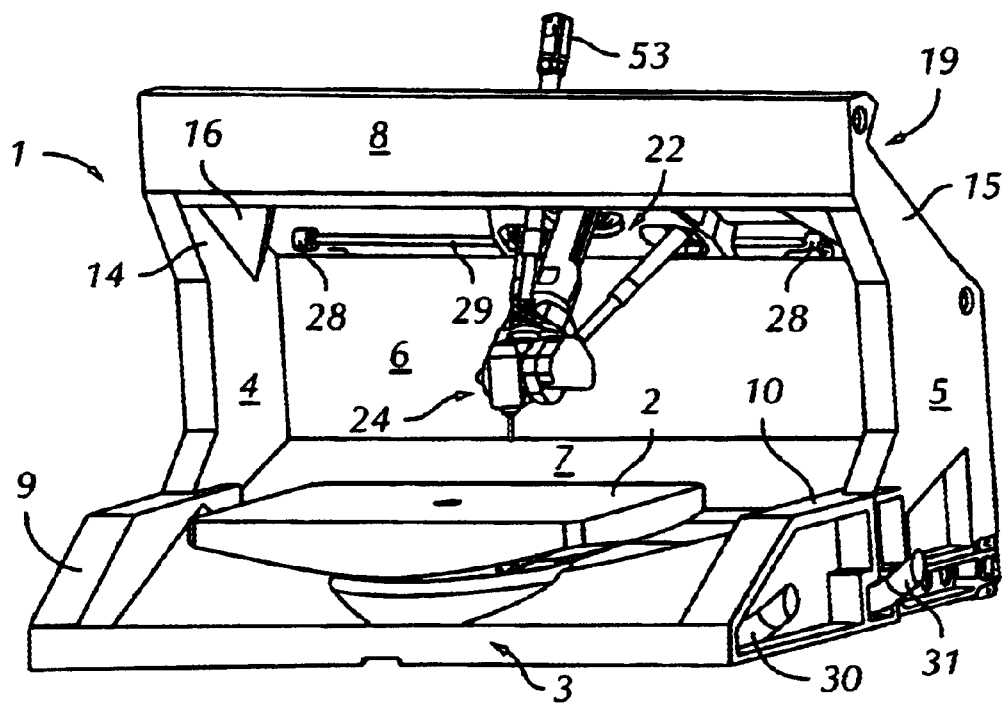
FIG. 1 is a perspective view of a universal combined milling and boring machine according to one embodiment of the invention.

Referring to FIG. 1 of the drawing, the machine tool contains rigid machine frame 1 and horizontal base 3. The horizontal base provides support for work table 2. The horizontal base is preferably integrated within the machine frame. The machine frame is designed in the form of a box, open on its front side and having two vertical side walls 4 and 5, vertical rear wall 6, bottom member 7 inclined to the front bottom and on which side walls 4 and 5 and rear wall 6 border, as well as lateral top front traverse 8, which joins the uppermost parts of side walls 4 and 5 with each other. Side walls 4 and 5 have a wider bottom part, each joined by side walls 9 and 10 of base 3, a narrower central part having a vertical front face, as well as top parts 14 and 15 projecting in an inclined fashion to the front. Traverse 8 spans top parts 14 and 15.

Figure 3:
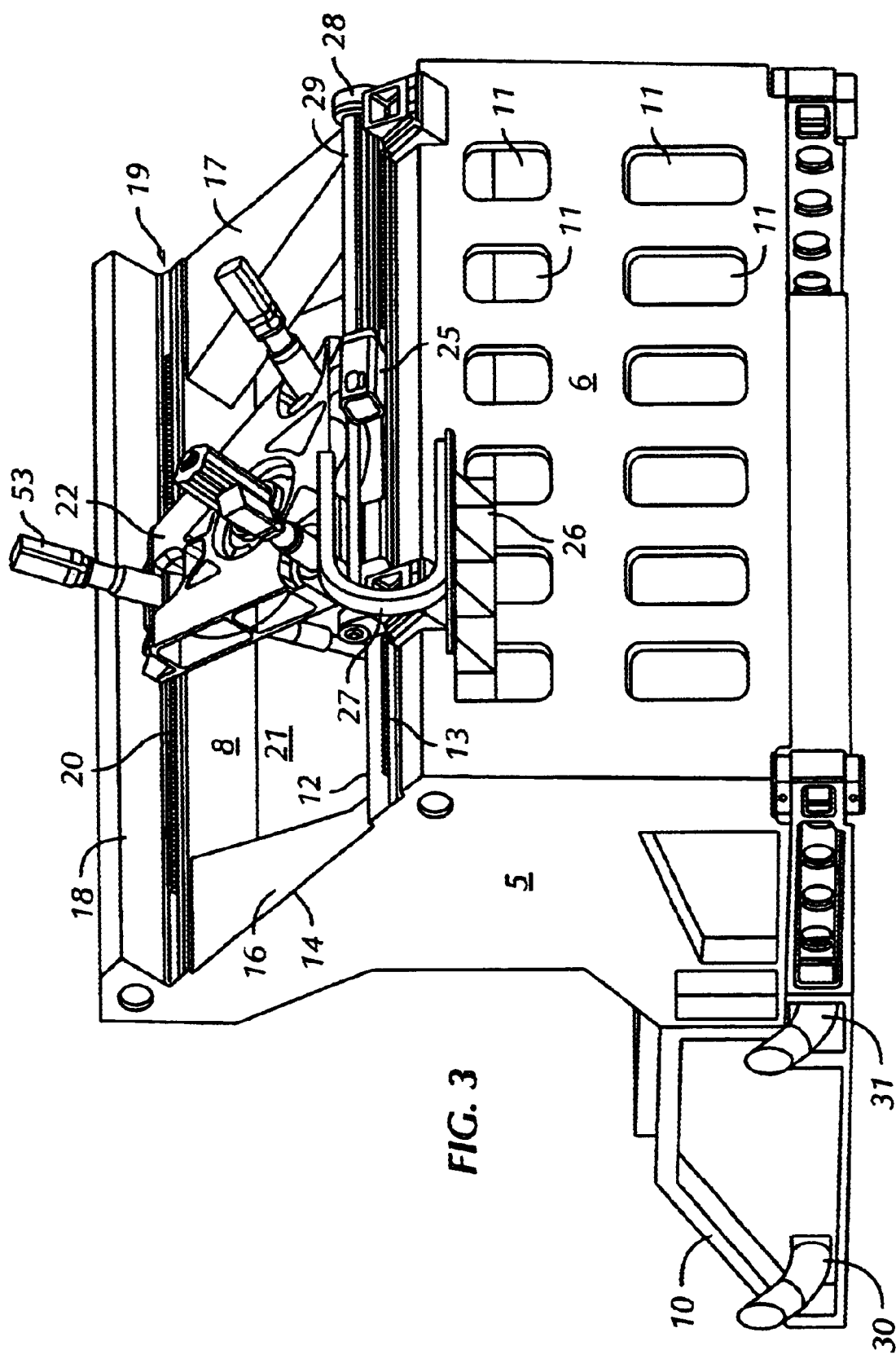
FIG. 3 is a perspective rear view of the embodiment of FIG. 1.

As evident in particular from FIG. 3, rear wall 6, which is provided with a plurality of recesses 11, has a height less than that of side walls 4 and 5. The rear wall has inclined end face 12 on which continuous guide rail 13 is fixed. Top portions 14 and 15 of the rear sides of side walls 4 and 5 are also inclined to the top front and are firmly connected with the respective ends of traverse 8. Cover elements 16 and 17 extending in the slope are provided on the inner side of each side wall 4 and 5. The top parts of the cover elements are fixed with the inner side of traverse 8. Another guide rail 20 is mounted in angular region 19 formed toward the front top by dimensionally stable continuous web 18 of traverse 8. The length of guide rail 20 is greater than free space 21 defined by two cover elements 16 and 17. Top supporting member, or slide 22, can be moved along guide rails 13 and 20. In this case, a spindle drive (ball caster spindle) serves as a drive unit for the traveling motion of the slide and consists of axis-parallel spindle 29 supported above end face 12 of rear wall 6 in two pedestals 28, and of recirculating ball nut 25 mounted on slide 22. Support 26 is mounted on the rear side of rear wall 6 for trailing cable 27. The trailing cable provides energy supply and control of the different units supported by slide 22.

In the embodiments shown in FIGS. 1 and 3, work table 2, shown as a revolving table, is arranged on base 3 so as to protrude to the front beyond the front edge of side walls 4 and 5. The work table is surrounded, at least in its rear part, by a trough-shaped chip collector that is defined, at least partially by inclined bottom member 7. Connecting tubes 30 and 31, which are shown as exiting right defining wall 10 of the base, conduct removal of the liquids and chips.

Figure 2:
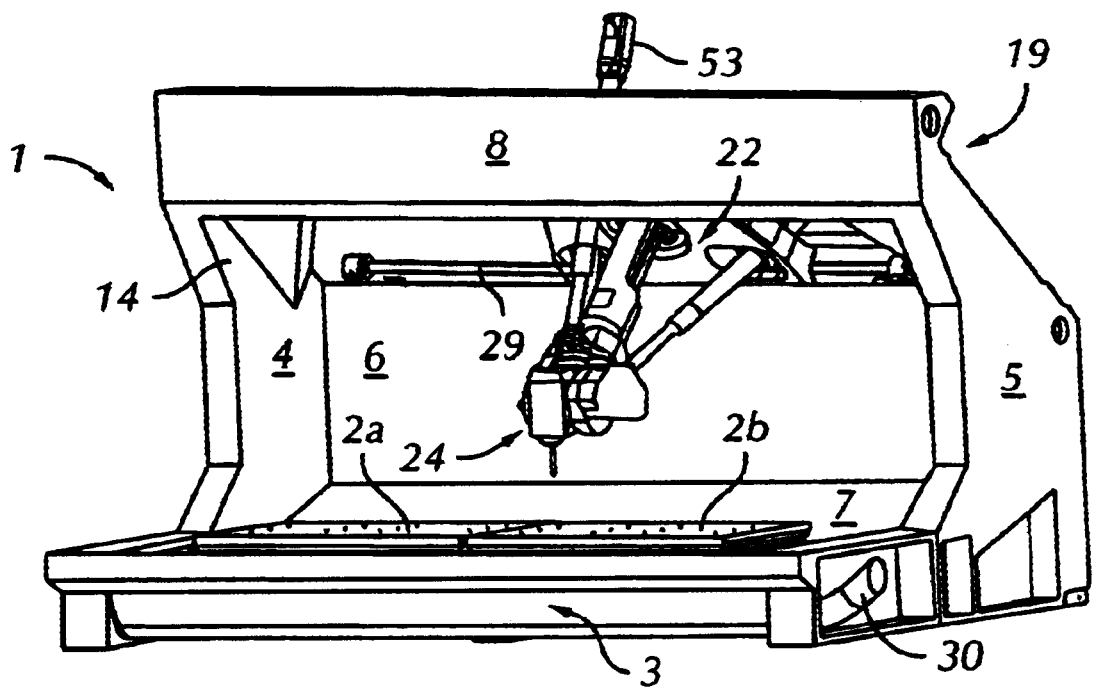
FIG. 2 shows the embodiment of FIG. 1 also having a double table.

The basic design of the universal combined milling and boring machine shown in FIG. 2 generally corresponds to the embodiment according to FIG. 1, so that the common elements in FIG. 2 correspond with the reference numerals of FIG. 1. However, the embodiment of FIG. 2 differs with respect to the embodiment of FIG. 1 in that base 3 serves as a support for two work tables, 2*a* and 2*b*, arranged side by side. Work tables 2*a* and 2*b* may be mounted fixedly on the base as shown, or may be mounted as revolving tables, similar to the single revolving table in FIG. 1. The use of two work tables increases the chip output as a whole, for example, by the possibility of alternating workpiece supply.

Figure 4A:
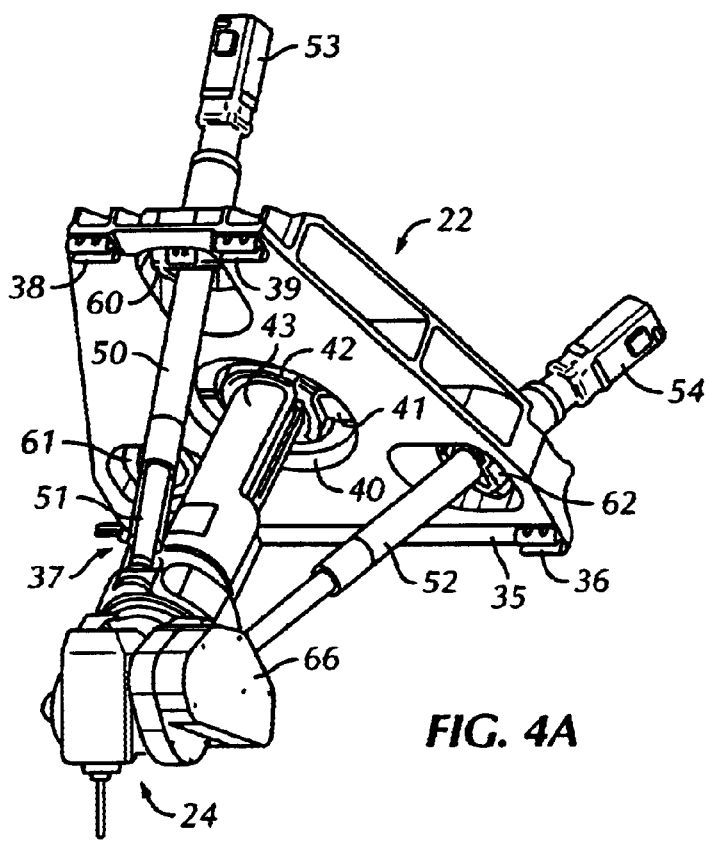
FIG. 4a shows an inclined front view of a supporting system of the spindle head with a triangular-shaped supporting member.
Figure 4B:
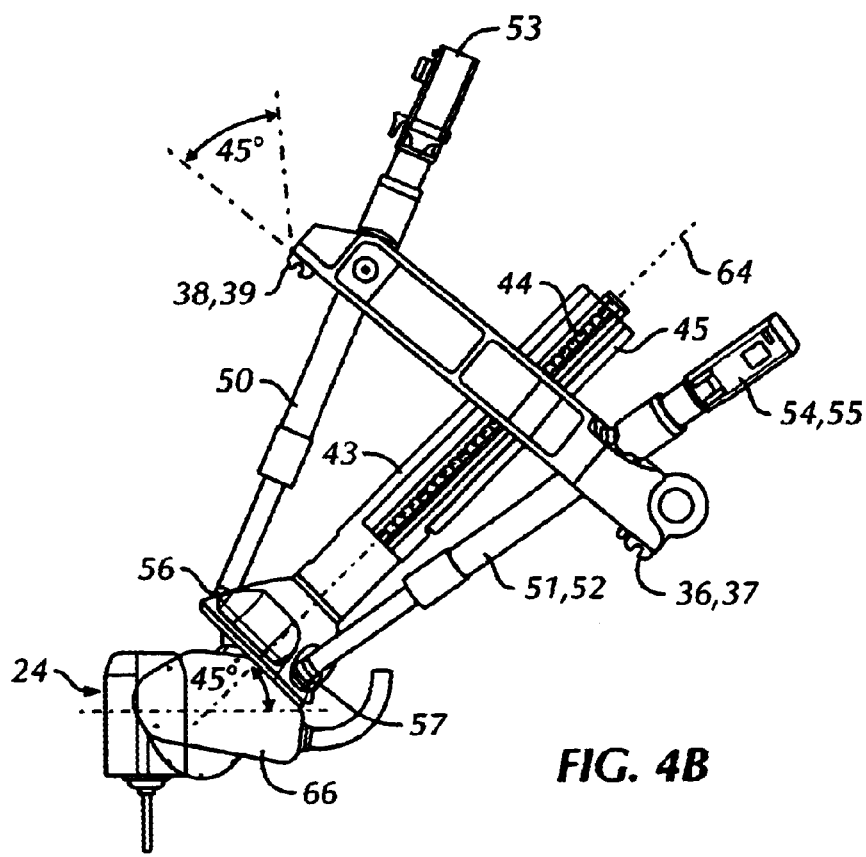
FIG. 4b is a side view of a supporting system of the spindle head with a triangular-shaped supporting member.

Both embodiments according to FIGS. 1 and 2 preferably use a supporting system, as shown in FIG. 4, for the machining unit, which is represented as spindle head 24. As an essential member, this supporting system contains highly rigid slide 22 formed as a flat chamber, which in a top view has the general shape of a triangle having a cut-off tip. On wider rear side 35 of slide 22, guide shoes 36 and 37 are mounted in the respective corner regions, both cooperating with guide rail 13 mounted on the inclined top side of rear wall 6. Two further fixedly mounted guide shoes 38 and 39, which run in guide rail 20 provided at traverse 8, are located on the narrow front side of slide 22. The configuration and development of the highly rigid slide ensures an accurate transfer of the loads transmitted by the machining unit to the slide and to the machine frame members.

Central circular recess 40, to which universal bearing 41 is attached, for example, in the form of a cardanic design, is disposed within slide 22. Central tube 43 is guided in a longitudinally movable and torsion-free manner in bearing bushing 42 of bearing 41 by means of two diametrically opposed linear guides 44. Two angular position measuring systems (not shown) are integrated into the two diametrically opposed cardanic bearing groups and supply corresponding measured values for the program control. In addition, longitudinally extending linear scale 45 is mounted on central tube 43, to which is associated a measuring member for detecting the feed motions of central tube 43 in the longitudinal direction.

Figure 5:
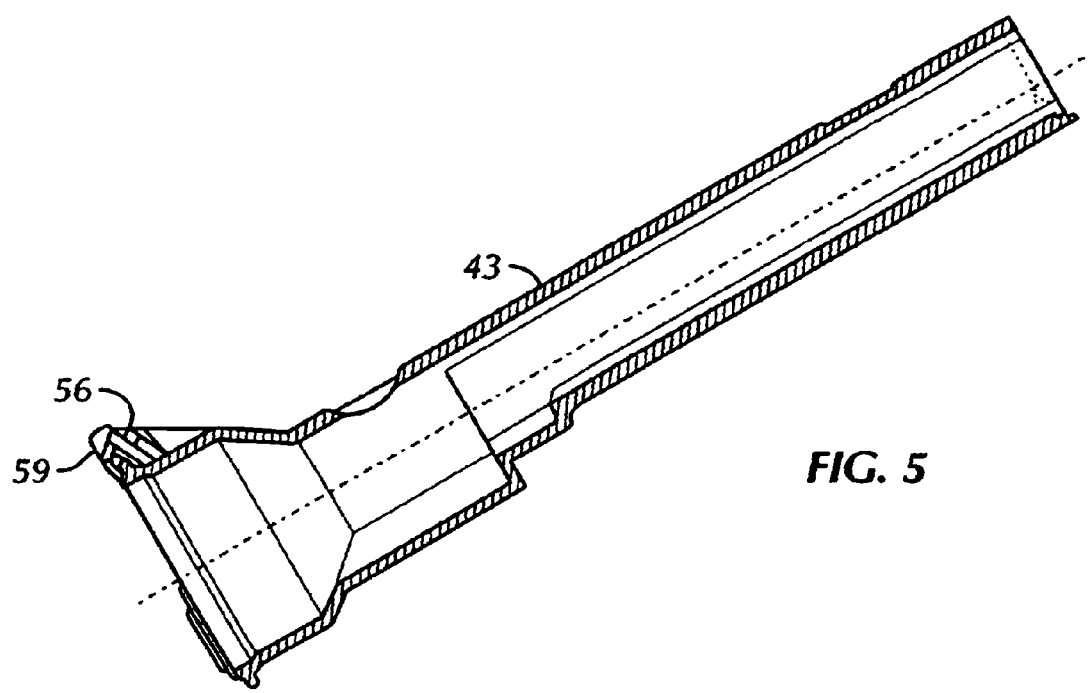
FIG. 5 is a sectional view of the central tube of the supporting system of one embodiment of the invention.

As shown in FIG. 5, central tube casing 43 consists of a single part, which increases the rigidity and also the positioning accuracy as compared to multi-part embodiments.

The support system of machining unit 24 also comprises three telescopic bars 50, 51 and 52, which are extendable by means of a motor, the outer tubes of which are flange-connected with drive units 53, 54 and 55. The inner bars of the telescopic bars are extended or retracted by actuating these drive units. The ends of these inner bars are supported in ball thrust bearings 56, 57 and 58, which are formed in widened end flange 59 of central tube casing 43. Spindle head support 66 is fixed on this end flange or mounted rotatably about central axis 64 of central tube 43, to which spindle head 24 is attached. A rinsing fluid supply (not shown) extends inside this spindle head support 66 and drive units for the working spindle and for their swiveling and revolving movements may also be contained therein.

In addition to the high rigidity degree of the machine frame, which is usually decisive for machining accuracy, the universal combined milling and boring machine of the above described embodiments has a further advantage of comfortable, and thus reliable, accessibility to the working area, since the work table projects from the side walls "cut out" on the front side. Another significant advantage follows from the moved masses that remain constant even with the most different machining processes and workpiece dimensions, and in the machine type according to the invention, only consist of the slide including the members fixedly mounted therein. Due to the movability of the slide supported in an overturning-proof and twist-proof manner within both guide rails 13 and 20, the respective machining position of the spindle can be optimized with respect to the stationary workpiece. The measuring system formed by the two angular position measuring systems in the cardanic bearing of central tube 43 and absolute linear measuring scale 45 enables the redundant determination of the tool position in the working area, as well as its angular position, and forms the basis of an overriding position control aiming at increasing the positioning accuracy. Moreover, the one-part design of the central tube casing results in both improved torsional rigidity and optimized strength of the ball bearings. Further, a rotary drive unit is adapted to be accommodated in the lower widened part of this casing. The preferred angular range of the inclined position of the supporting element or slide 22 is within the range of about 30° to about 60°, central tube 43 extending in its normal non-displaced central position perpendicularly to the slide plane. A slide arrangement at an angle of about 45° relative to the vertical is preferred (see FIG. 4b) when spindle head support 66 in the form of an equal-sided prism is used, on one side of which the milling head is mounted. A simple 180° rotation of spindle head support 66 about axis 64 of central tube 43 serves for moving spindle head 24 from its vertical position into its horizontal position, and vice versa.

The invention is not limited to the above-described embodiments. For example, in the case of smaller machines the slide may be developed as an integral part of an upper inclined cover wall, the support system for the machining unit being stationary in this embodiment. However, the inclined alignment of the support system should be maintained in this embodiment as well, so as to also obtain the corresponding inclined position of the central tube, since this serves for obtaining maximum dimensions of the working area including the handling of the workpieces while fed and also while machined.

The invention has been illustrated and described by means of specific embodiments. It is to be understood that numerous changes and modifications maybe made therein without departing from the scope of the invention as defined in the appended claims.

What is claimed is:

1. A relatively compact, program-controlled, universal combined milling and boring machine, said machine comprising:
    a horizontal base having a generally trough-shaped chip collector;
    a machine frame configured together with the horizontal base to form an integrated, dimensionally stable, supporting structure, wherein the integrated, dimensionally stable, supporting structure further comprises:
        two side walls;
        a front, top traverse having a horizontal guide therein, said guide having a length; and
        a lower rear wall having a horizontal guide therein, said guide having a length greater than the guide on said traverse,
    a work table supported by said horizontal base;
    at least one rotatable spindle head configured as an equal-sided prism; and
    a supporting system for said at least one spindle head, said supporting system aligned at an angular range of about 30° to about 60° relative to vertical, said supporting system comprising:
        a dimensionally stable central tube having a longitudinal axis and a lower end and configured as a single part;
        a spindle head support, wherein the lower end of the central tube is cardanically coupled to the spindle head support;
        at least three telescopic bars arranged at a solid angle displacement of about 120°, wherein the telescopic bars are cardanically coupled at a lower end thereof to the spindle head support;
        a top supporting member having an approximately triangular shape and at least four universal bearings therein, one disposed about the central tube and one disposed about each of the at least three telescopic bars, wherein the top supporting member is configured as a flat, dimensionally stable slide; and
        a motor for moving the slide along the horizontal guides;
    wherein the top supporting member of the supporting system is inclined between a top side of the rear wall and the traverse, and wherein said compact design of the machine and integrated dimensionally stable supporting structure provide a relatively high degree of machining accuracy for milling and boring workpieces.

2. A relatively compact, program-controlled, universal combined milling and boring machine, said machine comprising:
    a horizontal base;
    a machine frame configured together with the horizontal base to form an integrated, dimensionally stable, supporting structure, wherein the integrated, dimensionally stable, supporting structure further comprises:
        two side walls;
        a front, top traverse; and
        a lower rear wall, wherein said lower rear wall further comprises a horizontal guide of one length and the traverse further comprises a horizontal guide of a smaller length, wherein the slide is in contact with each of the horizontal guides,
    a work table supported by said horizontal base;
    at least one spindle head; and
    a supporting system for said at least one spindle head, said supporting system comprising:
        a dimensionally stable central tube having a longitudinal axis and a lower end;
        a spindle head support, wherein the lower end of the central tube is movably coupled to the spindle head support;
        at least three telescopic bars arranged at a solid angle displacement of about 120°, wherein the telescopic bars are movably coupled at a lower end thereof to the spindle head support; and
        a top supporting member having at least four universal bearings therein, one disposed about the central tube and one disposed about each of the at least three telescopic bars,
    wherein the top supporting member is configured as a flat, dimensionally stable slide;
    wherein the top supporting member of the supporting system is inclined between a top side of the rear wall and the traverse, and wherein said compact design of the machine and integrated dimensionally stable supporting structure provide a relatively high degree of machining accuracy for milling and boring workpieces.

3. The machine according to claim 2, further comprising a motor for moving the slide along the horizontal guides.

* * * * *